United States Patent
Bhatia et al.

(10) Patent No.: US 12,026,834 B2
(45) Date of Patent: Jul. 2, 2024

(54) METHOD TO DETERMINE FROM PHOTOGRAPHS THE PLACEMENT AND PROGRESS OF BUILDING ELEMENTS IN COMPARISON WITH A BUILDING PLAN

(71) Applicant: Reconstruct Inc., Menlo Park, CA (US)

(72) Inventors: Abhishek Bhatia, Champaign, IL (US); Derek Hoiem, Urbana, IL (US)

(73) Assignee: Reconstruct Inc., Menlo Park, CA (US)

( * ) Notice: Subject to any disclaimer, the term of this patent is extended or adjusted under 35 U.S.C. 154(b) by 162 days.

(21) Appl. No.: 17/661,125

(22) Filed: Apr. 28, 2022

(65) Prior Publication Data

US 2022/0398808 A1 Dec. 15, 2022

Related U.S. Application Data

(60) Provisional application No. 63/202,517, filed on Jun. 15, 2021.

(51) Int. Cl.
*G06T 17/20* (2006.01)
*G06T 7/73* (2017.01)
*G06T 17/10* (2006.01)

(52) U.S. Cl.
CPC .............. *G06T 17/20* (2013.01); *G06T 7/75* (2017.01); *G06T 17/10* (2013.01);
(Continued)

(58) Field of Classification Search
None
See application file for complete search history.

(56) References Cited

U.S. PATENT DOCUMENTS

| 7,583,275 B2 | 9/2009 | Neumann et al. |
| 9,558,559 B2 | 1/2017 | Fan et al. |

(Continued)

FOREIGN PATENT DOCUMENTS

WO 2014/197104 A2 12/2014

OTHER PUBLICATIONS

De Cubber; et al., "Combining Dense Structure From Motion and Visual SLAM in a Behavior-Based Robot Control Architecture", International Journal of Advanced Robotics Systems (2010), vol. 7, No. 1, pp. 027-038.

(Continued)

*Primary Examiner* — Peter Hoang
(74) *Attorney, Agent, or Firm* — Ascenda Law Group, PC

(57) ABSTRACT

A method of automatically producing maps and measures that visualize and quantify placement and progress of construction elements, such as walls, ducts, etc. in images. From a set of images depicting a scene, element confidences per pixel in each of the images are produced using a classification model that assigns such confidences. Thereafter, element confidences for each respective one of a set of 3D points represented in the scene are determined by aggregating the per-pixel element confidences from corresponding pixels of each of the images that is known to observe the respective 3D points. These element confidences are then updated based on primitive templates representing element geometry to produce a 3D progress model of the scene.

9 Claims, 3 Drawing Sheets
(2 of 3 Drawing Sheet(s) Filed in Color)

(52) U.S. Cl.
CPC ............... *G06T 2207/10028* (2013.01); *G06T 2207/20084* (2013.01); *G06T 2210/04* (2013.01)

(56) References Cited

U.S. PATENT DOCUMENTS

| | | | |
|---|---|---|---|
| 9,699,375 | B2 | 7/2017 | Fan et al. |
| 10,395,117 | B1 | 8/2019 | Zhang et al. |
| 10,776,902 | B2 | 9/2020 | Bergen et al. |
| 10,812,711 | B2 | 10/2020 | Sapienza et al. |
| 10,825,246 | B2 | 11/2020 | Lukau et al. |
| 2008/0310757 | A1 | 12/2008 | Wolber et al. |
| 2013/0155058 | A1 | 6/2013 | Golparvar-Fard et al. |
| 2014/0016821 | A1 | 1/2014 | Arth et al. |
| 2015/0310135 | A1 | 10/2015 | Forsyth et al. |
| 2019/0220665 | A1* | 7/2019 | Neumann ............... G06Q 10/02 |
| 2019/0325089 | A1 | 10/2019 | Golparvar-Fard et al. |
| 2021/0019215 | A1* | 1/2021 | Neeter ............... G06Q 10/06316 |
| 2021/0073449 | A1* | 3/2021 | Segev ..................... G06F 30/27 |

OTHER PUBLICATIONS

Degol; et al., "Geometry-Informed Material Recognition", IEEE Conference on Computer Vision and Pattern Recognition 2016 (CVPR '16), pp. 1554-1562 (2016).

Degol; et al., "FEATS: Synthetic Feature Tracks for Structure from Motion Evaluation," 2018 International Conference on 3D Vision (3DV), pp. 352-361 (2018).

Degol; et al., "Improved Structure from Motion Using Fiducial Marker Matching," 2018 Springer European Conference on Computer Vision (ECCV '18), pp. 273-288 (2018).

Fard, Mani Golparavar, "D4AR—4 Dimensional Augmented Reality—Models for Automation and Interactive Visualization of Construction Progress Monitoring", University of Illinois PhD Dissertation, 2010, 217 pgs.

Furlan; et al., "Free your Camera: 3D Indoor Scene understanding from Arbitrary Camera Motion," Proceedings British Machine Vision Conference 2013, pp. 24.1-24.12 (2013).

Huang; et al., "A Survey of Simultaneous Localization and Mapping", ARXIV.org, Cornell University Library, Ithaca, NY, Aug. 24, 2019, arXiv:1909.05214v3 [cs.RO] Jan. 1, 2020, 13 pgs.

International Search Report and Written Opinion mailed Apr. 6, 2021, from the ISA/European Patent Office, for International Patent Application No. PCT/US2020/063830 (filed Dec. 8, 2020), 21 pgs.

Kaminsky; et al., "Alignment of 3D Point Clouds to Overhead Images", 2009 IEEE Computer Society Conference on Computer Vision and Pattern Recognition Workshops (2009), 8 pgs.

Lemaire; et al., "SLAM with Panoramic Vision", Journal of Field Robotics (Jan. 1, 2007), 24(1-2):91-111.

Li; et al., "Spherical-Model-Based SLAM on Full-View Images for Indoor Environments", Applied Sciences 8(11):2268, Nov. 2018, 16 pgs.

Lowe, David G., "Distinctive Image Features from Scale-Invariant Keypoints," Int'l J. Computer Vision (Jan. 5, 2004), 28 pgs.

Pagani; et al., "Structure from Motion using full spherical panoramic cameras", 2011 IEEE International Conference on Computer Vision Workshops (ICCV Workshops) (2011), 8 pgs.

Saputra; et al., "Visual SLAM and Structure from Motion in Dynamic Environments: A Survey", ACM Computing Surveys (Feb. 2018), vol. 51, No. 2, Article 37, 36 pgs.

Stamos, "Geometry and Texture Recovery of Scenes of Large Scale", Computer Vision and Image Understanding (2002), 88(2):94-118.

Von Gioi; et al., "LSD: a Line Segment Detector," Image Processing On Line, 2 pp. 35-55 (2012) (available at http://dx.doi.org/10.5201/ipol.2012.gjmr-lsd).

Yao; et al., "MVSNet: Depth Inference for Unstructured Multi-view Stereo," 2018 Springer European Conference on Computer Vision (ECCV '18), pp. 767-783 (2018).

Yousif; et al., "An Overview to Visual Odometry and Visual SLAM: Applications to Mobile Robotics", Intelligent Industrial Systems (2015), 1(4):289-311.

* cited by examiner

METHOD TO DETERMINE FROM PHOTOGRAPHS THE PLACEMENT AND PROGRESS OF BUILDING ELEMENTS IN COMPARISON WITH A BUILDING PLAN

RELATED APPLICATIONS

This is a NONPROVISIONAL of, claims priority to, and incorporates by reference U.S. Provisional Application No. 63/202,517, filed Jun. 15, 2021.

FIELD OF THE INVENTION

The present invention relates to methods and apparatus to automatically produce maps and measures that visualize and quantify placement and progress of construction elements.

BACKGROUND

Automated construction progress monitoring is a "holy grail" for construction technology, as it would enable quality verification, work payment verification, schedule risk analysis, and transparency to all stakeholders, including subcontractors, general contractors, superintendents, project managers, executives, and owners. We use the term "progress monitoring" to encompass comparison of "what is there" and "what should be there," including which materials and elements are installed and whether they are installed in the correct locations. For short, we call this comparison Reality vs. Expectation. Reality can be represented in raw form by photographs of the job site or three-dimensional ("3D") point clouds, either obtained from laser scanners or photogrammetry. Expectation can be represented through 3D building information models (BIMs), two-dimensional ("2D") drawings, and schedule. The comparison can be performed, for example, by comparing 3D points to the BIM, or by color-coding drawings and comparing to expected regions or positions of elements on the drawings. "Automated monitoring" means that some or all of the comparison is performed without user intervention, once sufficient data (source material for Reality and Expectation) is provided to the system.

There are few if any commercially deployed systems to perform automated progress monitoring, and relatively little research. Some methods, e.g., by Mani Golparvar and colleagues (e.g., Golparvar et al., Journal of Computing in Civil Engineering 2015), involve geometrically comparing 3D points, obtained from laser scanners or photogrammetry, to 3D BIM to assess which work has been put in place. The geometric comparison may be augmented by material recognition (Degol et al., CVPR 2016) or object recognition. Technical challenges of this approach include accurately classifying the 3D points or incorrectly comparing irrelevant 3D points (e.g., corresponding to equipment or people) to the model. A more fundamental practical difficulty is that many projects do not have sufficiently detailed or accurate 3D BIMs to enable comparison of many elements of interest such as pipes, ducts, and electrical work.

SUMMARY

In one embodiment, the present invention provides a method for producing a 3D progress model of a scene, for example, a building construction site, that includes a set of 3D points with assigned probabilities of element presence and/or state. For example, the present method may include:

a. producing, from a set of images depicting the scene, wherein each respective one of the images has a known camera pose and a number of pixels and the scene includes the set of 3D points within it, and using a classification model (e.g., a deep neural network) that assigns confidences of element presence and/or state to image pixels given an image, element confidences per pixel in each of the images of the set of images;

b. computing element presence and/or state confidences for each respective one of the set of 3D points represented in the scene by aggregating the element confidences per pixel from corresponding pixels of each of the images of the set of images that is known to observe the respective one of the set of 3D points; and c. updating the element presence and/or state confidences based on primitive templates representing element geometry to produce the 3D progress model of the scene.

The element confidences per pixel from corresponding pixels of each of the images of the set of images that is known to observe the respective one of the set of 3D points may be determined using a visibility graph which indicates which images of the set of images observe each respective one of the set of 3D points. Further, the element confidences per pixel may be determined by, for each image, projecting the respective one of the set of 3D points using the known camera pose of the image to find coordinates of the respective one of the set of 3D points in an image space, and reading a confidence value from the image. Additionally, the primitive templates may be computed using an Expectation-Maximization algorithm to compute a likely set of primitive shapes and a probabilistic assignment of points to the likely set of primitive shapes.

The present method may also include visualizing the 3D progress model of the scene as a color-coded set of 3D points in a 3D viewer and/or as a color-coded 2D map on a display. Additionally, a state of progress of a set of denoted building elements may be determined using the 3D progress model of the scene and, optionally, may be aggregated into a report summarizing progress for locations of a building site.

These and further embodiments of the invention are described in greater detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is illustrated by way of example, and not limitation, in the figures of the accompanying drawings, in which.

DETAILED DESCRIPTION

Figure 1A:
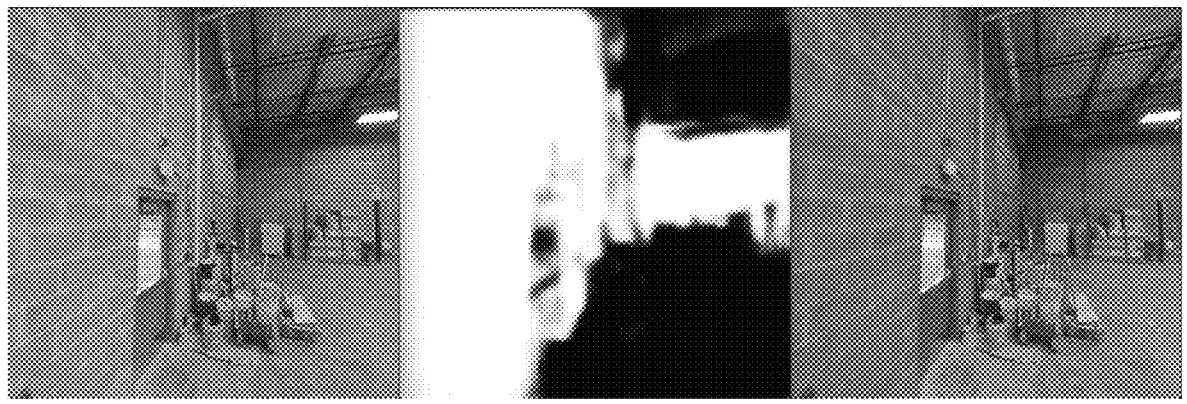
FIGS. 1A-1C are examples showing, for each of several images (left), a predicted confidence map (center), and an overlay (right) for "wall" and "duct" classes (elements), in accordance with an embodiment of the invention.

A photographic record of a site (e.g., architectural or industrial) can be generated from 360 panoramic images using a structure-from-motion process. This process determines relative poses of cameras that took the photographs, and a dense 3D as-built model is computed using the known camera poses. Through this process, the as-built model is aligned to photographs. The as-built model can then be aligned to design models, e.g., 2D drawings or blueprints or 3D CAD or BIMs, to visualize conditions and progress and perform quantity take-off.

One embodiment of the invention disclosed herein is a method to automatically produce maps and measures that visualize and quantify placement and progress of construction elements. The method identifies elements, such as walls and ducts, in images. The as-built model is used to map estimates to 3D and aggregate and refine estimates to produce a 3D progress map. The 3D progress map can be visualized by itself or overlaid with a 3D design model to visualize progress and placement. The 3D progress map can also be rendered into an overhead view to produce a 2D map of probabilities that each element type has been constructed at (or occupies) each position. Besides identifying elements, the state of construction may also be identified. For example, a wall may be determined to have completed "framing," "insulation," "gypsum board installation," "plastering," and/or "painting." The probabilistic 3D or 2D map of elements and states of progress can be programmatically or visually compared to the aligned design model or indicate or quantify progress. By comparing to past determinations of progress, visualizations of progress and productivity, such as tables and graphs, can be displayed.

Before describing the present invention in detail, it is helpful to present the following definitions, which are used herein.

Element of Interest: Building elements, such as walls, windows, doors, pipes, and ducts, for which presence, progress, or quality is to be determined. Determination of presence of elements of interest may also include determination of state, for example what steps in construction or installation have been performed for that element.

Progress Map: a data structure that stores the positions of elements of interest, either along a planar map such as a floor map ("2D progress map"), or in a 3D volume ("3D progress map").

Semantic Segmentation: The process of recognizing and understanding an image at the pixel level.

Drawing: A 2D image or document of construction plans, typically from a top-down orthographic view, indicating the planned location to install elements of interest.

Building Information Model (BIM): A 3D model of building plans indicating the 3D location, shape, and orientation of planned installation of elements of interest.

Image: A 2D color (e.g., RGB) or grayscale photograph, e.g., taken by a camera (e.g., a mobile phone camera or digital single lens reflex camera, etc.), drone, or 360-degree panoramic camera, which could be taken as a still image or extracted as a frame from a video file.

Camera Pose: The 3D position and orientation of a camera at the time an image is taken. The term may also be used to encompass intrinsic camera parameters sufficient to calculate the image coordinates that correspond to a 3D point.

Point Cloud: A set of 3D points representing the 3D geometry of surfaces observed by images of the scene. The surface normals as well as positions may be known and represented for each 3D point.

Structure-from-Motion (SfM): A process of solving for camera internal parameters and poses and the 3D positions of corresponding points, with correspondences obtained typically by feature matching or tracking; may also be called SLAM (Simultaneous Localization and Mapping).

Multiview Stereo (MVS): A process of solving for a dense set of 3D points given a set of images and the camera parameters and poses and possibly 3D points generated by SfM.

As alluded to above, in one embodiment the present invention provides automated progress monitoring of an element of interest (e.g., a window, duct, or wall) by:

a. Receiving a set of images, corresponding camera parameters, a 3D point cloud, correspondence of which points are observed by which image pixels, a model for assigning confidences to image pixels, and a 3D BIM or 2D drawing for comparison;

b. Assigning confidences to each pixel of each image, corresponding to the likelihood that the pixel depicts an instance of the element of interest, using a trained model;

c. Accumulating pixel confidences into 3D points, such that each 3D point has a likelihood or score for whether it corresponds to the element of interest;

d. Re-estimating the 3D point scores by taking into account the positions and scores of other 3D points and/or expected positions of elements in two or three dimensions;

e. Displaying the positions of elements by color-coding the 3D points in a 3D viewer or adding color to a drawing to indicate portions that are observed to correspond or not correspond to the element of interest; and f. If expected position and quantity of element have been provided, e.g., through an aligned annotated drawing or metadata in an aligned 3D BIM, performing additional analysis, e.g., to compute a percentage complete or a deviation of expected and observed position(s).

Receiving Data

Figure 4:
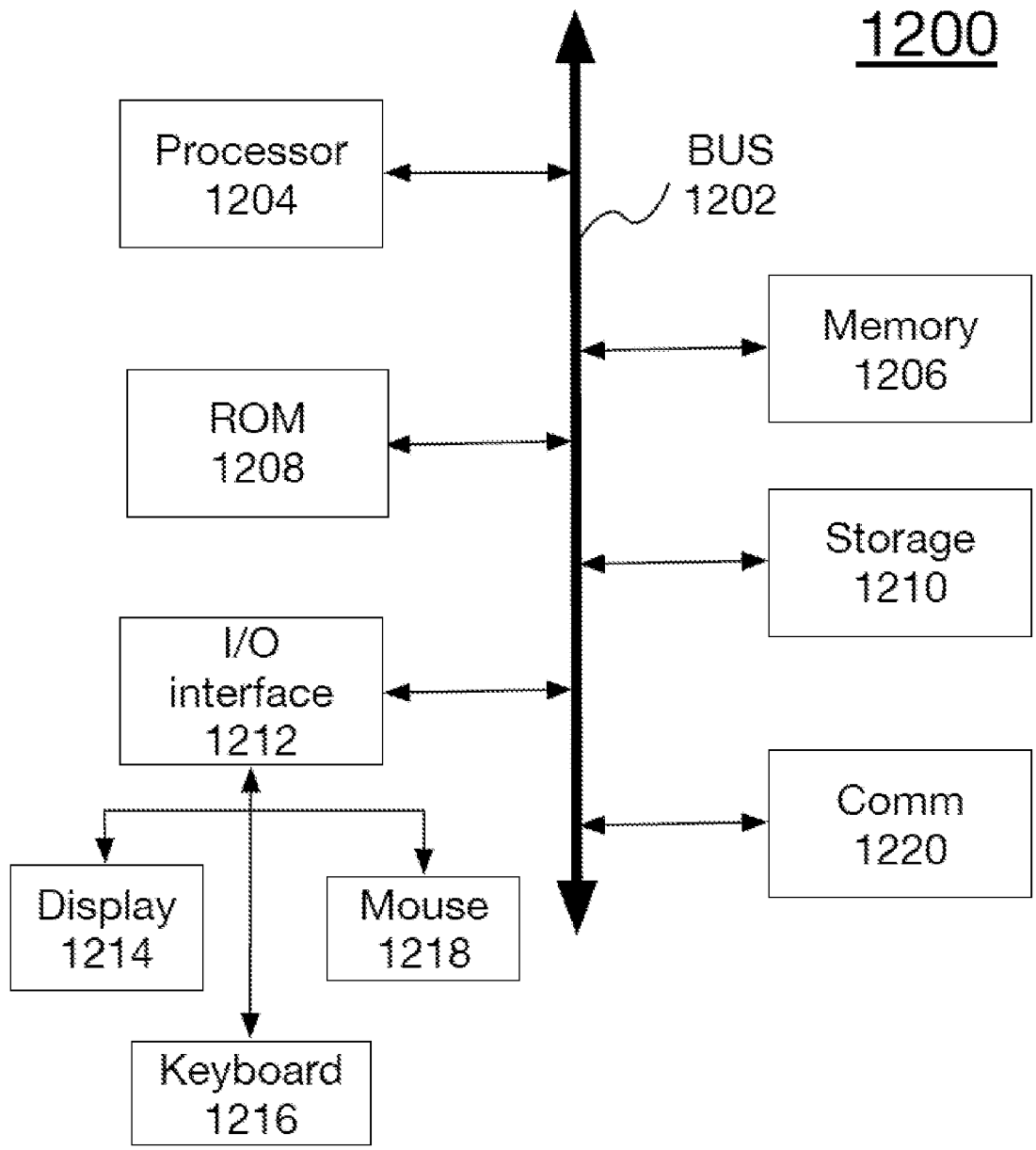
FIG. 4 illustrates an example of a computer system for automatically producing maps and measures that visualize and quantify placement and progress of construction elements in accordance with embodiments of the present invention.

FIG. 4 is a block diagram illustrating an exemplary computer system 1200 upon which embodiments of the invention may be implemented. Computer system 1200 includes a bus 1202 or other communication mechanism for communicating information, and a processor 1204 coupled with the bus 202 for executing instructions and processing information. Computer system 1200 also includes a main memory 1206, such as a random access memory (RAM) or other dynamic storage device, coupled to the bus 1202 for storing information and instructions to be executed by processor 1204. Main memory 1206 also may be used for storing temporary variables or other intermediate information during execution of such instructions by processor 1204 as required by the methods described herein. Computer system 1200 further includes a read only memory (ROM) 1208 or other static storage device coupled to the bus 1202 for storing static information and instructions for the processor 1204. A storage device 1210, such as a magnetic disk, optical disk, or solid state drive is provided and coupled to the bus 1202 for storing information and instructions. In response to processor 1204 executing sequences of instructions contained in main memory 1206, which instructions may be read into main memory 1206 from another computer-readable medium, such as storage device 1210 and/or ROM 1208, computer system 1200 performs the process steps described herein. One or more of main memory 1206, ROM 1208, and/or storage device 1210 may be used to store a 3D BIM or other plan of a construction site, received and/or extracted images of the site, as well as metadata concerning the features depicted in the images and camera pose related thereto.

Computer system 1200 may also include a display 1214 for displaying information to a user, as well as one or more input devices, such as an alphanumeric keyboard 1216, mouse 1218, etc. coupled to the bus 1202 via an input/output interface 1212 for communicating information and command selections to the processor 1204. Computer system 200 also includes a communication interface 1220 coupled to the bus 1202. Communication interface 1220 provides a two-way, wired and/or wireless data communication path for the computer system, e.g., to/from one or more computer networks and/or network of networks (e.g., the Internet), allowing computer system 1200 to send and receive messages and data.

In accordance with embodiments of the invention, one or more processing devices, such as computer system 1200, receive several types of data:
   a. A set of images depicting the construction or building site. These images can be in the form of individual files or a video file, from which images can be extracted as frames. The images can be perspective, equirectangular, fisheye, or other formats, and may have been taken by any consumer or professional photography device.
   b. Camera parameters sufficient to compute the pixel coordinate to which a 3D point projects. Camera parameters may include extrinsic parameters, such as 3D translation and 3D orientation, and intrinsic parameters such as focal length, principal point, skew, aspect ratio, and distortion parameters.
   c. A 3D point cloud consisting of a set of 3D points and, optionally, color values that represents the positions of objects and surfaces within the site. The point cloud may have been produced by a depth sensor, laser scanner, photogrammetry, or by other means.
   d. A classification model that receives an image and outputs a confidence for each pixel. The parameters of the model should be such that high confidence is assigned to pixels that look like the element of interest, and low confidence assigned to pixels that do not. The assignment of confidence to an individual pixel may be based on its own intensity or color, as well as the colors or intensities of surrounding pixels or the entire image. Other than its own parameters and the image, the classification model does not require any further inputs, and the only output is a confidence for each pixel for each element of interest. The classification model may correspond to a deep neural network or another machine learning model that has been trained from annotated data.

The processing device(s) may also receive one or more additional types of data:
   a. A visibility graph that indicates for each 3D point which images observe that point. The visibility graph may be a byproduct of photogrammetry, or computed based on rendering processes.
   b. A BIM that contains information about the 3D shape, position, and orientation of elements of interest.
   c. A drawing that depicts the expected positions of elements of interest or provides visual map or reference of a relevant portion of the site.
   d. Annotations on the drawing that demarcate or delineate expected positions of elements of interest and/or that indicate the scale of the drawing.

If the visibility graph is not provided, one must be computed, e.g., considering a 3D point visible to a camera if no other 3D points of lesser depth project within threshold pixel distance to the projection of the 3D point.

The BIM and/or drawing(s) are required to perform certain analysis such as percent completion or calculation of displacement between expected and observed placement, and they may also be used as a basis of refining estimates of point confidence.

Assigning Confidences to Pixels

As indicated above, one component of the present system is a trained model that assigns a likelihood as to whether a pixel depicts an element of interest. The model (or classifier) can be a deep neural network or any other machine learning model, which has been trained on annotated data. The model, given an input image and its own learned parameters, should output high confidence for the pixel's class and low confidences for other classes. For example, a model that classifies into "wall" and "not wall," when provided an image of a room, should output high confidence for "wall" on each pixel in which a wall is visible and low confidence for "wall" for every other pixel. It is possible for a pixel to have more than one label, e.g., to be both "wall" and "brick wall." In such cases, the model should output high confidence for each label that applies and low confidence for any others. The classifier may output confidence for a particular state, for instance that the wall is in the "framing" stage of construction or "drywall" stage.

We use a deep neural network for the labeling task. U-Net (Ronneberger et al. 2015) and DeepLab (Chen et al. 2017) are two examples of applicable network designs, but others could also be used. The loss function is a multi-label loss function, i.e., there is one binary classifier for every label present in the training data. Mean (average) binary cross-entropy is minimized across all labels and pixels in order to train the model. Such a trained model can then be used to create confidence maps per label for the input image.

Figure 1B:
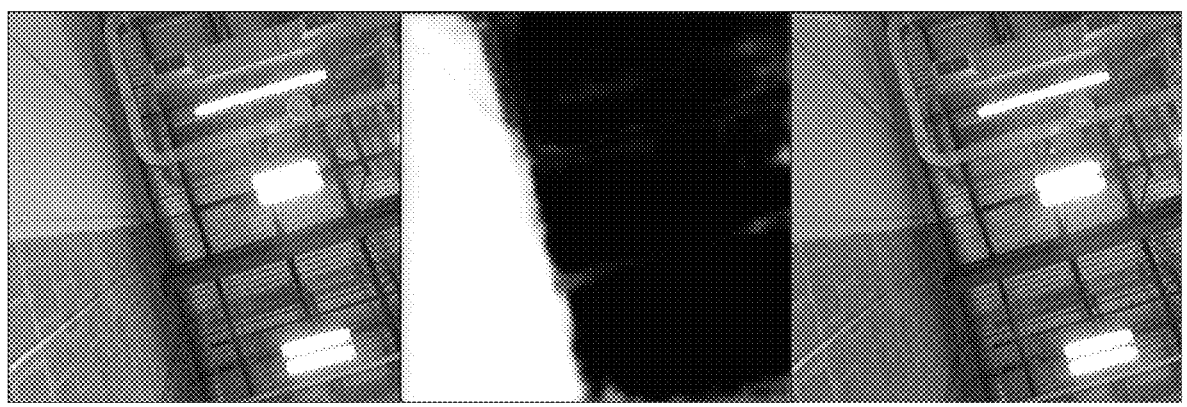
Figure 1C:
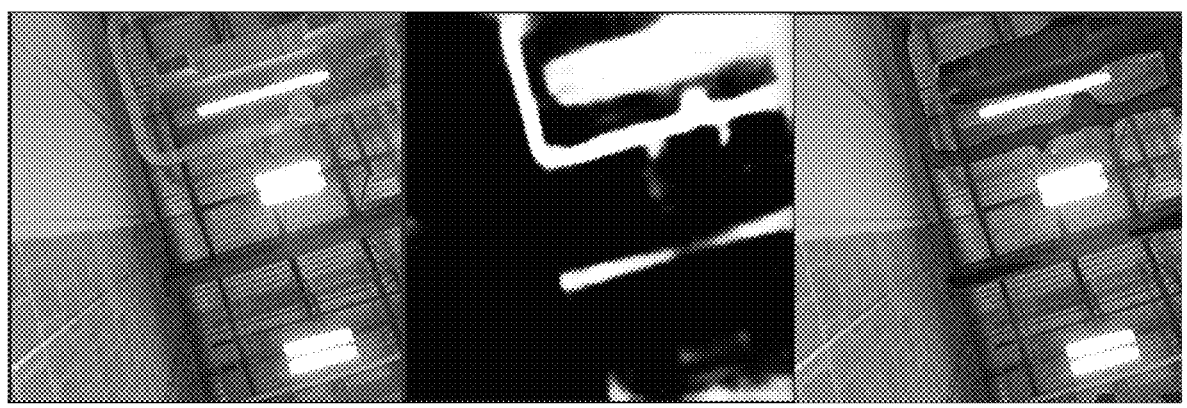

The examples shown in FIGS. 1A-1C demonstrate for each image (left), a predicted confidence map (center) and an overlay (right) for "wall" (FIGS. 1A and 1B) and "duct" (FIG. 1C) classes.

Assigning 3D Point Confidences

The present system may either receive or compute a visibility graph which indicates which images observe each 3D point. Given a confidence map per image, this graph is used to aggregate 3D point confidences for each class of interest.

For each 3D point and given class m,
   a. Using the visibility graph, get all the images, denoted I, in which the point is visible. Also, get the confidence maps for each image in I and class m, as described above for "Assigning Confidences to Pixels."
   b. For each image in set I,
      i. Project the 3D point using the camera pose and parameters, i.e., find its coordinates in image space. Such a transformation matrix is generally of the form K[R t], where K is a camera intrinsic matrix, R is the Rotation, and t is the translation.
      ii. Using nearest neighbor interpolation, read the confidence value $c_i$ from the image. Other interpolations, such as bilinear interpolation, may also be used.
   c. Using all the pixel confidences collected in b(ii), compute the aggregated 3D point confidence as weighted average, i.e., $\Sigma w_i c_i / \Sigma w_i$, where $w_i$ is the weight for image i which can either be 1.0 (i.e., unweighted average) or could account for viewpoint, e.g., distance between point and camera. In one embodiment, an unweighted average is used.

Refining 3D Point Confidences

So far, the 3D point confidences are based on the appearances of the images that view the points, but the 3D geometry of the points is not explicitly factored into the prediction. In many cases, elements of interest have a predictable geometry, e.g., piecewise planar for walls, or piecewise cylindrical for pipes. Given a "primitive template" that specifies where we expect to observe an element, we can refine our estimates of which points correspond to elements.

This primitive template can be produced or provided in multiple ways, e.g.:
- a. Fit a set of 3D primitives such as planes for walls and lines for pipes and estimate the extent of each. The primitives can be fit to only points that are confidently labeled as corresponding to that element, or can be generated from an unlabeled point cloud.
- b. User or external system provides 3D mesh models, e.g., from an aligned BIM.
- c. User or external system provides 2D areas or line segments indicating where elements are expected to be installed on the floor map.

In one embodiment the first option is used as a primitive template, which reduces the information that needs to be provided directly to the system, but this need not necessarily be so. Because the template may not precisely correspond to the actual position that an element is installed (or may not be perfectly fit or exhaustively cover all installed elements), we want to use its positions and extents as features or soft indicators, rather than requiring labeled points to correspond to templates. Our approach is to assign each point to the closest template and use its relative position and orientation as a feature. For example, the distance and orientation relative to the closest wall-plane template may be computed for each 3D point.

If primitive templates are not provided, templates may be fit to the 3D points as follows:
- a. Starting from the 3D confidences (see "Assigning 3D Point Confidences," above), filter out low confidence points.
- b. Fit or choose appropriate shape models (e.g., plane or cylinder) for the current class. For example, planes for walls.
- c. Apply RANSAC (random sample consensus) or MSAC (M-estimator sample consensus) or another shape-fitting method to solve for sets of shape parameters such that the surfaces of fitted shapes are close to the points. "Efficient RANSAC for point-cloud shape detection" (Schnabel et al. 2007) describes one applicable method in detail.

The algorithm to assign final 3D point confidences for each element class m is as follows:
- a. Randomly sample many points from the 3D points, find the closest primitive to each point, and compute relative distance and orientations.
- b. Use Expectation-Maximization to estimate histogram models for distance and orientation features using sampled points.
  - i. Let $P_m(y_i=1|im)$ be the aggregated 3D confidence (0.0-1.0) from the deep-neural network that an $i^{th}$ 3D point belongs to class m. $P_m(y_i=0|im)=1-P_m(y_i=1|im)$. im is the set of all images used to obtain the confidence.
  - ii. Let $P_m(y_i=1|im, geom)$ be the probability of belonging to class m, conditioned jointly on the images and the geometry. Using Bayes' rule, $P_m(y_i|im, geom)$ is proportional to $P_m(y_i|im)*P_m(geom|y_i)$.
  - iii. $P_m(geom|y_i)$ encodes geometry and is factored as a product of two 1-dimensional functions: $P_m(geom|y_i)=P_m(d_i|y_i)*P_m(o_i|y_i)$ where $P_m(d_i|y_i)$ encodes distance "$d_i$" of the 3D point to the closest primitive, and $P_m(o_i, y_i)$ encodes relative orientation "o" of the 3D point compared to the orientation of the nearest point on the surface of the primitive. These functions can be represented as 1-dimensional histograms.
  - iv. $P_m(geom|y_i=0)$, $P_m(geom|y_i=1)$, $p(y_i=1)$ are initialized by computing weighted probability distributions, with weights of $P_m(y_i=1|im)$ and $P_m(y_i=0|im)$.
  - v. E Step:
    1. Compute $P_m(y_i=1|geom, im)=P_m(geom|y_i=1)$ $P_m(im|y_i=1)$ $P_m(y_i=1)/(P_m(geom|y_i=1)$ $P_m(im|y_i=1)$ $p(y_i=1)+P_m(geom|y_i=0)$ $P_m(im|y_i=0)$ $p(y_i=0))$. Note that $P_m(im|y_i)$ can be computed as $P_m(y_i|im)$ $P^m(im)/P_m(y_i)$, yielding the simpler form: $P_m(y_i=1|geom, im)=P_m(geom\ y_i=1)$ $P_m(y_i=1|im)/(P_m(geom\ y_i=1)$ $P_m(y_i=1|im)+P_m(geom\ y_i=0)$ $P_m(y_i=1|im))$.
  - vi. M Step:
    Using $P_m(y_i|geom, im)$ from E-step, re-estimate the parameters of $P_m(geom|y_i)$ and $P_m(y_i)$. More specifically, re-compute weighted histograms $P_m(d_i|y_i)$ and $P_m(o_i|y_i)$ using $p(y_i\ geom, im)$ as the weights. $P_m(y_i)$ is re-computed using the arithmetic mean of $P_m(y_i\ geom, im)$ over all points.
  - vii. The EM Algorithm consists of performing the E Step (d)(v) and M Step (d)(vi) repeatedly in alternation until convergence, typically defined as the average change in pixel confidence in successive iterations being below a specified threshold.
- c. For each 3D point "i", compute the refined confidence by using the point's relative distance and orientation to its nearest primitive and the expression from (b)(v)(1).

Displaying Observed Elements of Interest in 2D or 3D

Given a point cloud and corresponding refined 3D confidences for a class, visualizations can be created in both 2D and 3D depending on the application. The point cloud can be aligned in 3D against a BIM model or can be aligned in 2D against a drawing. The confidence values (ranging from 0.0-1.0) can be used to modulate the intensity of a color channel for the 3D point cloud or the alpha (transparency) value in the case of a 2D map. More specifically, the alpha value can be computed as confidence$^y$*255, where we choose y=2.4.

Figure 2:
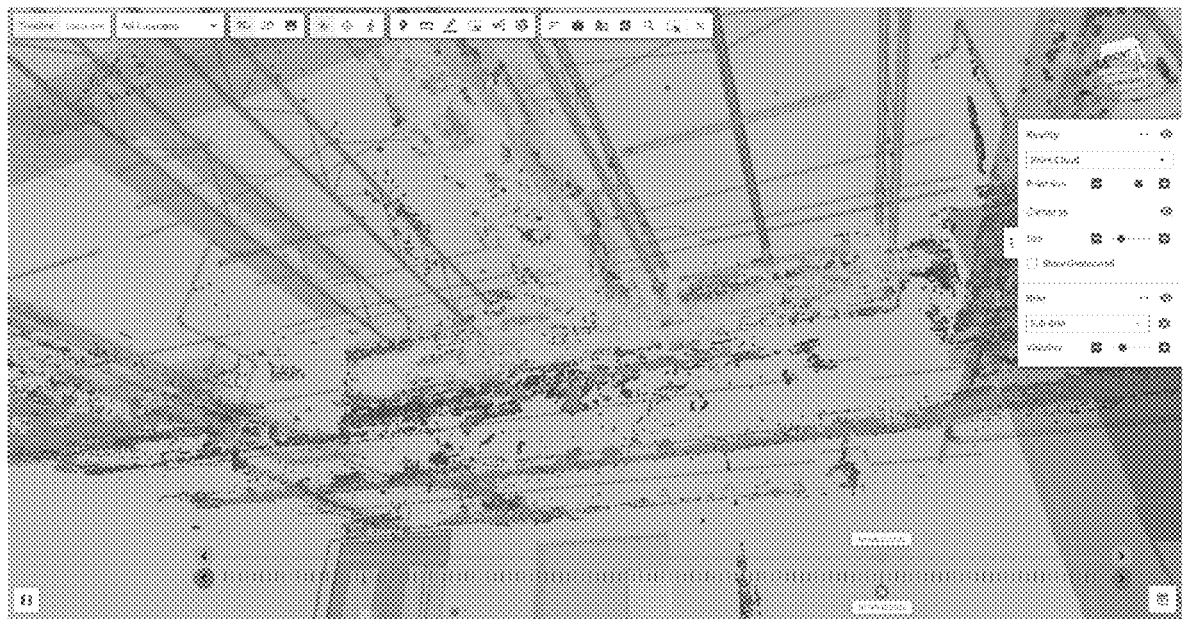
FIG. 2 is a screenshot of a 3D progress map viewed within a web viewer on a display in accordance with an embodiment of the invention.

FIG. 2 is a screenshot of a 3D progress map viewed within a web viewer in accordance with one embodiment of the present invention. The class "duct" is visualized in 3D, with points assigned green intensity according to refined 3D confidences (see "Refining 3D Point Confidences," above). More confident "duct" points are brighter compared to less confident points. Only points with confidence above a threshold (0.5 in this example) are displayed. Different colors for different states of progress could be used so that, for example, insulated and uninsulated ducts are differentiated with different colors (e.g., green and blue).

Assuming that the 3D scene is aligned correctly with the gravity (e.g., along the Z axis), 2D maps can be derived from the 3D point clouds by projecting the points on the X-Y plane in a certain way. The following describes how to compute a 2D progress map from a 3D point cloud and 3D confidences for a given class.
- a. Initialize an appropriately sized 2D map by estimating the region of interest. The map should consist of 4 channels (R-G-B-A) where R=Red intensity, G=Green intensity, B=Blue intensity, A=alpha value. The initial map can be R=255, G=255, B=255, A=0, which implies that the map is transparent.
  b. For each 3D point with confidence above a certain threshold,
    i. Get the X-Y pixel coordinates in the 2D map, read the current alpha value from the 2D map as $\alpha_{init}$. Compute the new alpha value from the 3D confidence as $\alpha_{new}$=(confidence$^y$)*255, where y is a parameter. If $\alpha_{new}$>$\alpha_{init}$, then color a circle of radius r pixels centered at X,Y with (R=0, G=255, B=0, A=$\alpha_{new}$) where r governs the desired point size.
  c. Filter the 2D map with a median filter to remove isolated points. The filter size is proportional to the map size (at least 5×5, or 0.6% of minimum map dimension rounded to be odd-numbered size in one example).
  d. If camera positions are known in 3D space, they can be projected onto the 2D map (X-Y plane) to get a set of 2D camera points. An approximate "observed" area can be computed as the 2D convex hull of these camera points. This is represented as the blue region in FIG. 3.
  e. If an aligned drawing is available, overlay the above 2D map with the drawing.

Figure 3:
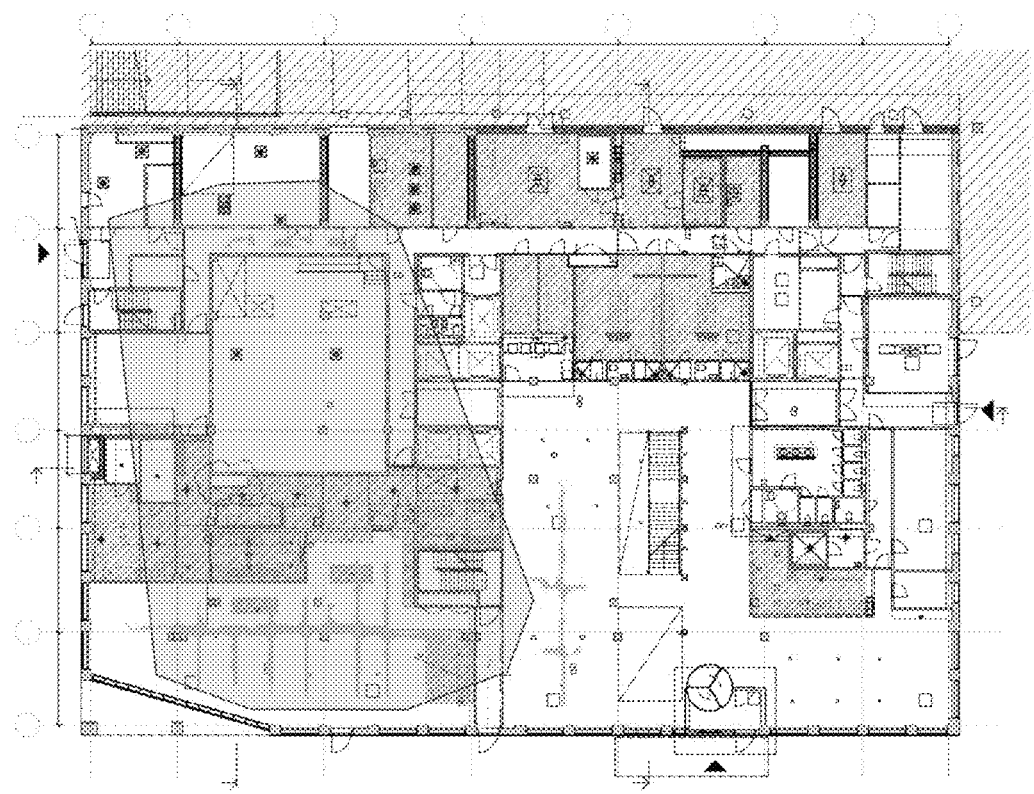
FIG. 3 is an example of a 2D progress map created in accordance with an embodiment of the invention.

FIG. 3 is an example of a 2D progress map created using the described method. The blue region shows the "observed area" formed by the convex hull of 2D camera positions. The green markings indicate where the system has determined that the ducts are present. As for the 3D progress maps, color codings can be used to indicate the state of construction and/or the type of element being displayed.

Quantifying Progress

If the system is provided with quantity take-off annotations on the design model, then percent progress for each type of element can be calculated. Percent progress is determined by credit assignment based on state of construction and unit count, length, or area. For example, a 20 foot wall that has been framed may be considered 25% complete, and a 30 foot wall that has been insulated may be considered 50% complete. If these are the only walls of interest, then the total progress would be (20*25%+30*50%)/(20+30)=40%.

An element may be assigned to a state of progress based on the confidences in the 2D or 3D progress maps, in correspondence with the plan and quantity-take off annotations. For example, if at least threshold percent of the element of interest is close to 2D/3D progress points with at least threshold confidence of a particular state, then that state is assigned to the element. If multiple states could be assigned to the element, only the latest (i.e., one corresponding to greatest progress) is assigned. If an element has been assigned to one state based on manual determination or previous application of this method, the element can be later assigned only to the same state or more advanced states.

Progress can be displayed per instance element, aggregated across locations, or aggregated across the project. Progress can also be aggregated across element types within a category, e.g., to summarize progress of interior and exterior walls separately or together. Progress can be displayed using tables, charts, overlays on drawings, and coloring/transparency of a BIM.

Thus, methods and apparatus to automatically produce maps and measures that visualize and quantify placement and progress of construction elements have been described.

What is claimed is:

1. A method for producing a three-dimensional (3D) progress model of a scene that includes a set of 3D points and, for each 3D point of the set of 3D points, a confidence of a presence and/or state of an element of interest, the method comprising:
  receiving a set of images depicting the scene, wherein each respective one of the images has a known camera pose and a number of pixels, and a set of 3D points representing a geometry of the scene;
  receiving a classification model that produces a confidence of a presence and/or state of an element of interest for each pixel of an input image based on the content of the input image;
  producing, using the classification model, the confidence of the presence and/or state of the element of interest for each pixel of each respective image of the set of images;
  computing the confidence of the presence and/or state of the element of interest for each respective one of the set of 3D points represented in the scene by aggregating the element confidences per pixel from corresponding pixels of each of the images that is known to observe the respective one of the set of 3D points; and
  updating the confidence of the presence and/or state of the element of interest, based on at least one primitive template, to produce the 3D progress model of the scene.

2. The method of claim 1, wherein the classification model is a deep neural network.

3. The method of claim 1, wherein the confidences of the presence and/or state of the element of interest per pixel from corresponding pixels of each of the images of the set of images are determined using a visibility graph which indicates which images of the set of images observe each respective one of the set of 3D points.

4. The method of claim 3, wherein the confidences of the presence and/or state of the element of interest per pixel from corresponding pixels of each of the images of the set of images are, for each respective image of the set of images, determined by projecting the respective one of the set of 3D points using the known camera pose of the respective image to find coordinates of the respective one of the set of 3D points in an image space, and reading a confidence value from the respective image.

5. The method of claim 1, where the at least one primitive template is computed using an Expectation-Maximization algorithm to compute a likely set of primitive shapes and a probabilistic assignment of points to the likely set of primitive shapes.

6. The method of claim 1, further comprising visualizing the 3D progress model of the scene as a color-coded set of 3D points in a 3D viewer.

7. The method of claim 1, further comprising visualizing the 3D progress model of the scene as a color-coded two-dimensional (2D) map on a display.

8. The method of claim 1, further comprising determining a state of progress of a set of denoted building elements using the 3D progress model of the scene.

9. The method of claim 8, where the state of progress of the set of denoted building elements is aggregated into a report summarizing progress for locations of a building site.

* * * * *